C. L. A. BRASSEUR.
HALF TONE SCREEN.
APPLICATION FILED MAR. 26, 1915. RENEWED SEPT. 4, 1920.
1,374,813.
Patented Apr. 12, 1921
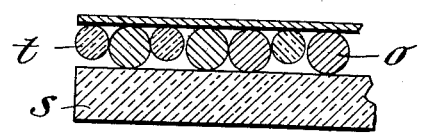
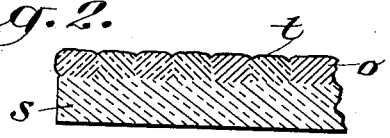
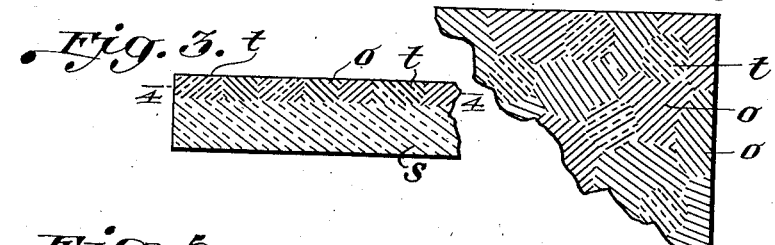
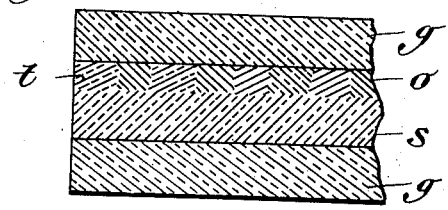
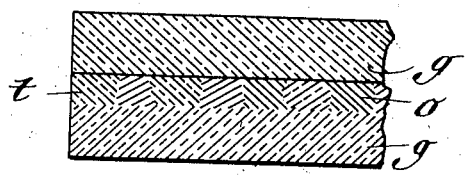
Inventor:
Charles L. A. Brasseur,
by Wm Wallace White
Atty.

UNITED STATES PATENT OFFICE.

CHARLES L. A. BRASSEUR, OF ORANGE, NEW JERSEY.

HALF-TONE SCREEN.

1,374,813.  Specification of Letters Patent.  Patented Apr. 12, 1921.

Application filed March 26, 1915, Serial No. 17,251. Renewed September 4, 1920. Serial No. 408,309.

*To all whom it may concern:*

Be it known that I, CHARLES L. A. BRASSEUR, a citizen of the United States of America, residing at 116 Tremont avenue, Orange, New Jersey, have invented new and useful Improvements in Half-Tone Screens, of which the following is a specification.

The object of this invention is to produce half-tone screens suitable for making negatives for relief-plates for typographic printing, for intaglio plates and for the lithographic and allied arts.

At present the great majority of half-tones are made from cross-lined screens, obtained by cementing together the engraved surfaces of two ruled glass screens, the lines on each of which, all of equal width, are alternately transparent and opaque, care being taken that the lines on one screen cross the lines on the other at right angles.

The resulting pattern is made up of small transparent squares each of which is surrounded by an opaque area. Such screens enable one to obtain gradation of tones, from the faintest gray due to the tiny dot of silver or other deposit formed under the center of a transparent area by a faint light to the complete black formed by the spreading and coalescing of the silver or other deposits under adjacent areas by a strong light.

Although magnificent results have been obtained with such screens, the very regularity of their construction is the cause of two defects: One, that the prints have a somewhat mechanical appearance; the other, that when used for color printing a pattern is formed by the crossing of the lines of the various superposed prints, which pattern becomes more and more pronounced as more colors are superposed.

These defects are unavoidable when printing many colors, with any screen whose pattern is regularly recurrent. Grained effects have been obtained before by reticulating gelatin; also by graining copper plates but the graining is irregular in shape and uncontrollable as to size, so that commercially such methods have but little use.

To obviate these defects I have devised a grained screen made up of transparent and opaque particles distributed thereon so as to form no regular pattern whatsoever, the transparent areas being of a definite and predetermined size.

As it is essential that the light transmitting particles be as transparent as possible, I prefer to make these of celluloid or other analogous material, while the opaque particles, though preferably of the same material, need not necessarily be so.

By an opaque particle I mean one which is opaque to the light forming the image or, in other words, one which will not allow that light to appreciably impress the silver or other compound under said particle during the necessary exposure time. For instance if the silver or other compound be sensitive only to blue light it is evident that intense yellow or orange particles, entirely absorbing said blue light, would meet the requirement as to opacity. They are, therefore, not necessarily black though the latter color is by far the safer for general use.

Certain structural embodiments of the invention are disclosed in the accompanying drawing, in which:

Figure 1 is a transverse sectional view through a screen, showing the grains mounted upon the support before heat and pressure have been applied thereto;

Fig. 2 is a similar view of the screen after heat and pressure have been applied and a homogeneous mass has been produced;

Fig. 3 is a similar view after the application of heat and pressure to leave a smooth surface;

Fig. 4 is a sectional view on line 4—4 of Fig. 3;

Fig. 5 is a sectional view through a half-tone screen mounted between two plain, parallel glass plates.

Fig. 6 is a similar view of a modified form of construction.

I make up the two varieties of particles in any suitable manner, as by cutting up threads of celluloid or other suitable material, of the required diameter, into very short lengths and then roll them into spheres. It is obvious that other ways are available, such as punching them out of a sheet, or by sifting powdered material through maximum and minimum sieves and thus obtaining particles of approximately uniform size, etc., and then preferably rolling them into spheres.

The transparent and opaque particles are then mixed together and applied to a support by any means well known to the art, but I prefer those described in my U. S. Letters Patent No. 974,464 of Nov. 1st, 1910.

In the drawing, referring particularly to

Figs. 1 and 2, the reference character s designates the transparent support for the opaque and transparent grains o and t respectively of the screen. In Figs. 1, 2, 3, 5 and 6 of the drawings, the relative positions of the grains have been exaggerated somewhat in order to show clearly the manner in which they act when subjected to heat and pressure. As a matter of fact, the grains are distributed promiscuously upon the support and would not be arranged in rows as shown in the said figures of drawing.

For rendering half-tones, the proportion of transparent and opaque particles should be such that when finished, one quarter of the surface of the screen should be covered by transparent particles and three quarters by the opaque. For special purposes any other proportion can be used. This proportion, one to three, can be had by mixing one part of transparent particles and three parts of opaque ones and thoroughly mixing the whole. I prefer the following method: The transparent particles are made out of comparatively hard celluloid while the opaque ones are made of softer celluloid or analogous material of the same or somewhat larger diameter as shown in the drawing. The exact relative diameters and the proportions of each kind of particle to be used must be determined experimentally as a number of variable factors come into effect. My aim in using materials of differing hardness is to obtain a screen the hard transparent particles of which, when subjected to the heat and pressure necessary to obtain the polished surface, will maintain their circular outline, while the opaque particles, being soft, will be forced about them and completely fill up the interstices and make one solid grained film the grains being welded to the underlying support, as shown in Fig. 2 of the drawing, for instance.

If the grained film is to be used in the camera it should be cemented between two polished plate-glasses g or the grained film can be formed directly on one glass g' and then have another glass g cemented to it. If the grained film is to be used in the printing-frame between an ordinary negative and the sensitized plate, or copper or other plate on which the half-tone is to be printed, then it must be mounted on or made directly on a supporting film of celluloid or analogous material the thickness of which must vary with the fineness of the grain. The construction is the same as that shown in Figs. 1 and 2. The finer the grain the thinner must be the supporting film.

By this method, grained screens, as above described, can be made with grains to correspond in size with the standard ruled screens, that is from 100 to 400 or more transparent spaces to the linear inch. The grains, being promiscuously distributed, form no regular recurrent pattern, and as a consequence color-prints particularly for lithographic purposes made from such screens can be superposed in any number, without any pattern being formed. Moreover, all such prints are free from any mechanical appearance.

Having described this invention to the details of which disclosure it is not of course to be limited, what is claimed as new and what is desired to be secured by Letters Patent is set forth in the appended claims:

1. In a half-tone screen, a support surfaced with irregularly disposed transparent and opaque areas, the transparent areas or units on any one screen being substantially of uniform size.

2. In a half-tone screen, a support surfaced with transparent and opaque particles.

3. In a half-tone screen, a support surfaced with irregularly disposed transparent and opaque particles.

4. In a half-tone screen, a support surfaced with transparent and opaque particles, said transparent particles being of regular outline and said opaque particles being of irregular outline.

5. In a half-tone screen, a support surfaced with transparent and opaque particles, the portion of the surface covered by the opaque particles being greater than the portion of the surface covered by the transparent particles.

6. In a half-tone screen, a support surfaced with transparent and opaque particles, said opaque particles being of softer material than said transparent particles.

In testimony whereof I have signed my name to this specification in the presence of two subscribing witnesses.

CHARLES L. A. BRASSEUR.

Witnesses:
  JOHN C. SANDERS,
  DUDLEY B. HOWARD.